May 4, 1948. B. E. MAREAN, JR., ET AL 2,440,827
NAVIGATIONAL INSTRUMENT
Filed Aug. 20, 1945 3 Sheets-Sheet 1
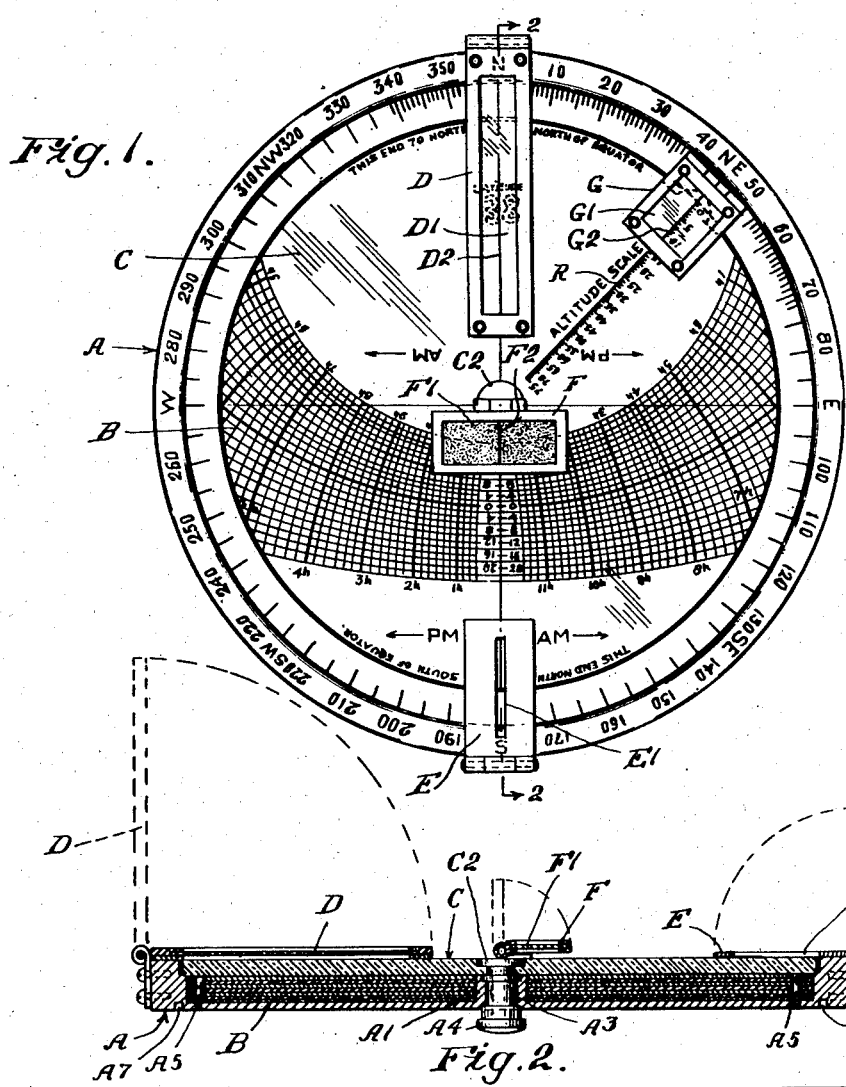
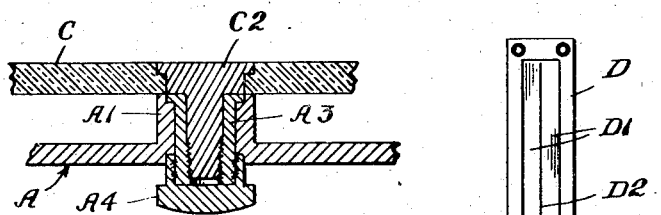
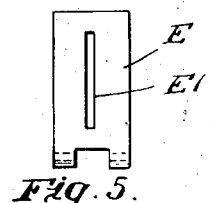
Inventors
Browning E. Marean, Jr.
and Lloyd V. Killham
By H. F. Kirkpatrick
Attorney.

May 4, 1948.   B. E. MAREAN, JR., ET AL   2,440,827
NAVIGATIONAL INSTRUMENT
Filed Aug. 20, 1945   3 Sheets-Sheet 2

Inventors
Browning E. Marean, Jr.
and Lloyd V. Killhem
by H. F. Kirkpatrick
Attorney Patented May 4, 1948

2,440,827

UNITED STATES PATENT OFFICE 2,440,827

NAVIGATIONAL INSTRUMENT

Browning E. Marean, Jr., Boston, Mass., and Lloyd V. Kielhorn, Bradenton, Fla.

Application August 20, 1945, Serial No. 611,610

3 Claims. (Cl. 33—61)

This invention relates to a navigational instrument and its object is, given the assumed latitude of the observer and the declination of a celestial body, in particular the sun, to enable the operator to determine, within the accuracy of practical marine and aerial navigation, (1) the altitude of the body observed, (2) the azimuth of that body, (3) the location of the true meridian, and (4) the local hour angle of the body. The instrument may be used to solve mechanically the astronomical triangle. The only table needed for the manipulation of the instrument is the table of the declinations of the celestial body observed for the days of the year.

The instrument is capable of being manipulated in a life boat, for example, to find the altitude of the sun, to find the sun's bearing, to find true north and the true course of the boat, to place and keep the boat on any desired true course, to find the time of day, and to find the compass error.

The instrument may be so organized as to be based upon any projection of the celestial sphere upon a plane, but the stereographic projection is preferred as the simplest and the best adapted to the purposes of the instrument.

Fig. 1 is a plan view of the instrument;

Fig. 2 is a vertical cross-section on the line 2—2 of Fig. 1;

Fig. 3 is a vertical cross-section of the means for securing the rotatable disc to the base;

Figs. 4 and 5 show the hinged sight vanes;

Referring to Figs. 1 and 2, the instrument has a circular base A on the upper periphery of which are marked the cardinal and intercardinal points of the compass and degree numbers arranged to go with a scale on an adjacent member B marked for every degree clockwise from the north point N through 360°. The base A has a circular cavity adapted to house a pile of cards B of the stereographic projections of the celestial sphere which may conveniently be for every two degrees of latitude, 0° through 64°. The rim of the base A is grooved to receive a circular disc C of transparent material, which is capable of being turned about its center.

The disc C is removable for access to the pile of cards. The base A has at its center, Fig. 3, an upwardly projecting boss A1 having a central hole in which is located a pin C2 which has a head which fits into a circular groove around a central opening in the disc C. The lower end of the pin is in threaded engagement with the lower end of a sleeve A3 to the lower end of which is secured a stud A4 projecting below the bottom of the base A. An upper circular rim of the sleeve A3 fits into a circular groove in the upper end of the boss. By this arrangement the pin C2 may be unscrewed by turning the stud A4 so that the disc C may be removed in order to insert or remove the cards in the base and to place the appropriate card on the top of the pile so that it is visible through the transparent disc. The sleeve may be turned by the stud to draw down and secure the pin in vertical position so that the head of the pin holds the disc in place so that it may be turned or held against turning.

Figure 8:
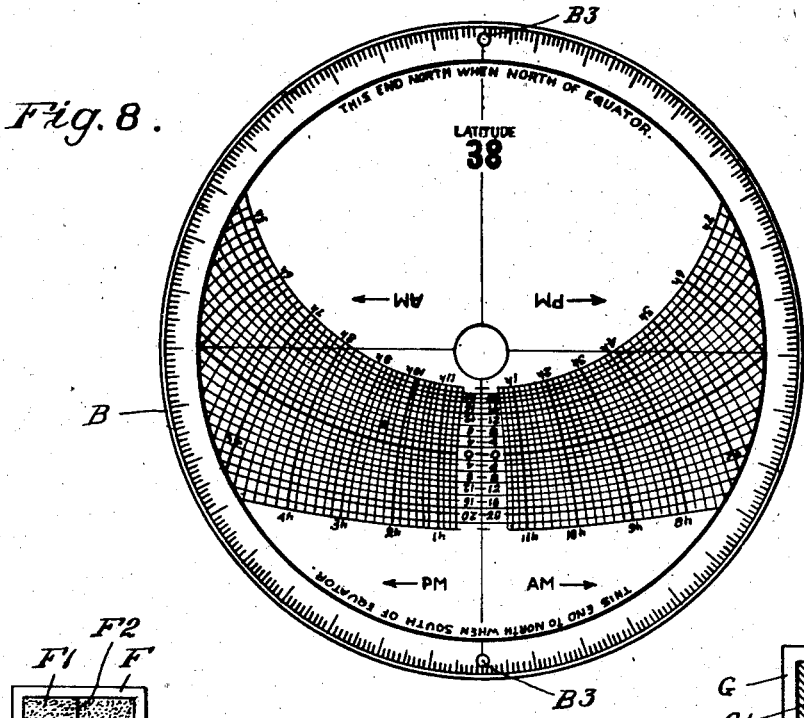
Fig. 8 shows a card on which is a stereographic projection of a portion of the celestial sphere for the use of the instrument with the observer at an assumed latitude of 38° north, for example.
Figure 13:
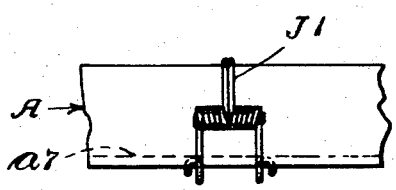
Figs. 13 and 14 are end and side views respectively of one of the spring clips on the periphery of the base A.
Figure 14:
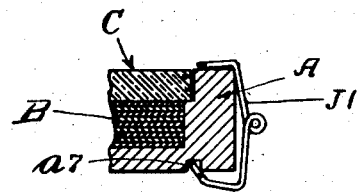

The base A is provided with pins A5, Fig. 2, which project upwards and are adapted to enter holes B3 in the cards B, Fig. 8, to hold them in position. The base A has a circular groove A7, Fig. 2, which is adapted to assist in holding two clips J1, Figs. 13 and 14, which may be moved to positions on the periphery of base A and overlap its top edge.

Each of the outside surfaces of the base A at the north and south points has a flat tangent surface, Fig. 2, and to these surfaces are secured hinged vanes D and E, Figs. 4 and 5, which can be folded down on the top of the disc C when the instrument is not in use or can be raised to a position perpendicular to the disc C in the operation of the instrument as shown in broken lines, Fig. 2.

The vane D at the point N is in the form of a frame having a transparent glass pane D1 in the center of which is a thin wire D2, or other linear mark, which is in line with the point N and is perpendicular to the disc C when the vane is raised. The vane E at the point S is of metal and contains a central linear slot E1 which is in line with the point S and is perpendicular to the disc C when the vane is raised. The operator looks through this slot in using the instrument.

Figures 6, 7:
Fig. 6 is a view of the central vane.
Fig. 7 is a view of the vane at the end of the altitude scale.

At the center of the disc C is secured a hinged vane F which may lie flat on the disc or may be raised to a position perpendicular to the disc. This vane, Fig. 6, is provided with a translucent frosted glass pane F1 which, when in such perpendicular position, is in a plane passing through the axis of the instrument. It has a linear mark or line F2 which, when the vane is in that position, lies in the center of rotation of the disc C.

Adjacent to the periphery of the disc at the end of the radius R, on which is marked the stereographic altitude scale, is fastened a hinged vane G, Fig. 1. This vane may lie flat on the disc or may be raised to a perpendicular position. The vane, Fig. 7, consists of a frame containing a transparent glass pane G1 having a gnomon consisting of a linear mark G2 which is perpendicular to the disc when the vane is raised and lies in a plane perpendicular to disc C and containing the altitude scale line R, Fig. 1, and the line F2 of the vane F.

Marked on the undersurface of disc C is the radial line R, Fig. 1, which is marked with a stereographic projection of altitude from 0° to 75°. This radial line is continued to the periphery of disc C in order to measure the altitude and read the computed azimuth of the observed celestial body on the outer scale of degrees on the edge of the base A and on the card B visible through the transparent disc C.

In the manipulation of the instrument, the observer removes the disc C and places on the top of the pile of cards the card corresponding to his assumed latitude, i. e., the latitude (for example 38° N.) at which he determines, according to his best information, that he happens to be. The periphery of the card is marked in degrees as shown in Fig. 8. He replaces the disc and raises the hinged vanes D, E, F and G to perpendicular positions with respect to the base of the instrument. He holds the instrument in a vertical plane so that, as he looks through the slot E1 in the vane E, the wire D2 on the vane D and the line F2 on vane F are horizontal, i. e., on the horizon. He thus brings the projection of the celestial meridian, the line N, S on the card, to a horizontal position. He turns the disc C until the shadow of the gnomon G2 cast by the sun falls on the line F2 of the vane F. The reading in degrees from N on the edge of the base A and on the card to which the radius line R points is the altitude of the sun (for example 48°).

The altitude of the sun having thus been found, the next operation is to find the sun's bearing from the true north or azimuth.

The observer, knowing the approximate day of the year, finds that day in the table of date lines or declinations of the sun which for convenience may be printed on the back of the instrument, the figures for the north declinations being in black and those for the south declinations being in red.

From this table the observer selects the date line corresponding to the day of the year. If it is April 16 or August 28, for example, that line is 10° north, i. e., above the projection of the equator, the 0—0 arc, Fig. 8. If the day, for example, is February 12 or October 30, the declination of the sun is 14° south and the date line is the arc which is 14° below the equator projection. The table is calculated for each day of the year and is a well known table used for purposes of navigation.

The observer, next holding the instrument in the horizontal plane, turns the disc C to bring the figure of altitude on the radius line R, which is the observed altitude of the sun (for example 48°), into coincidence with the declination or date line on the card (taken for example as 10°).

He then turns the whole instrument in a horizontal plane until the shadow of the gnomon G2 in the vane G cast by the sun coincides with the radius line R. The radius through 0° or N, the north point, points to the true north. The angle, which the radius line R makes with the radius through 0°, i. e., the north point N on the edge of the base A, is the bearing from the true north or azimuth of the sun.

Having found the bearing of the sun, as above described, the true course of the boat may be found by the observer taking a position over the keel line of the boat, holding the instrument in a horizontal position and turning it until the shadow cast by the gnomon G2 of the vane G coincides with the radius line R. One of the clips, J1, is then moved to a position on the edge of the base A in which it is in line with the bow of the boat. The true course of the boat in degrees is measured from the point N to the clip.

If it is desired to place the boat on another course the other clip is moved on the edge of the base A to a position in which it indicates the new course and then the bow of the boat is turned until it is in line with this clip, while still maintaining the instrument in such a position that the shadow of the sun cast by the gnomon G2 falls on the radius line R.

Figure 9:
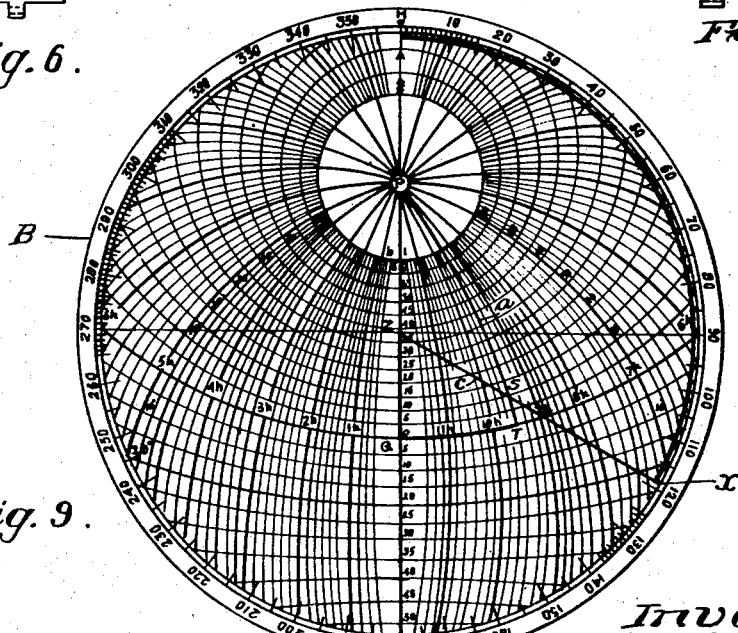
Fig. 9 shows a stereographic projection of the celestial sphere illustrating the principles on which the use of the instrument is based.

The instrument also gives the sun time or the local apparent time. When the sun's bearing is determined, the altitude figure on the line R lies on the date line at a certain point on that line. That point on that line indicates such time. As shown in Fig. 9, the date line being 10° north, it is 9½ hours, i. e., half past nine in the morning, sun time.

Figure 10:
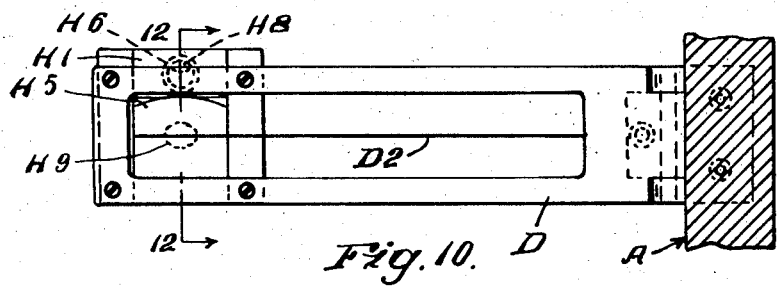
Fig. 10 shows a bubble level fastened to the end of the vane D.
Figure 11:
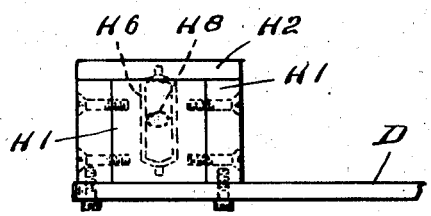
Fig. 11 is a plan view looking down on the level in the position shown in Fig. 10.
Figure 12:
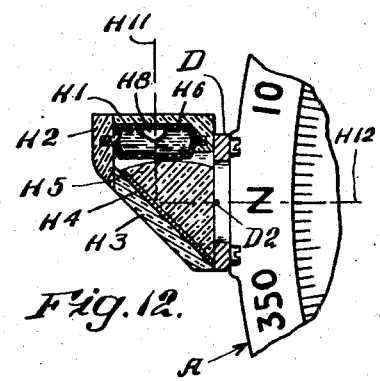
Fig. 12 is a cross-section on the line 12—12 of Fig. 10.

As above pointed out, the instrument is first held in a vertical position with the line N, S, in a horizontal position. Means, such as a bubble level, may be employed to bring the line N, S into a horizontal position. As shown in Figs. 10-12, a block having sides H1, H2 and H3 is fastened by screws to the end of the vane D. Secured in this block is a closed transparent tube H6 containing a liquid in which there is a bubble H8. When the line N, S is horizontal the bubble is in the middle of the tube. The block contains a magnifying lens H4 with a curved surface adjacent to the tube H6 and a mirror H5 set at 45° to the tube. When the observer looks along the line H12, Fig. 12, he sees the enlarged reflection of the bubble in the mirror along the line H11. When the middle of the bubble reflection is cut by the mark D2, as in Fig. 12, the line N, S is horizontal and the instrument is in proper position for manipulation to determine the altitude of the observed celestial body. The device enables the observer to dispense with holding the mark D2 on a visible horizon and enables him to use the instrument when the horizon is not visible. A simple bubble level might be fastened at any point to the periphery of the base A where the observer could thereby ascertain when the line N, S was horizontal.

The principles on which the instrument and its manipulations in the process of determining the true north are based are as follows:

Fig. 9 is a stereographic projection of the celestial sphere, as observed from a position 38° above or north of the celestial equator, the outside circumference of the projection is the celestial horizon, the center point Z is the zenith of the observer, the line P, Z, Q, is the celestial meridian of the observer. The arc 270°, Q, 90° is the projection of the celestial equator. All arcs above and below the celestial equator are arcs of equal declination or parallels of declination as observed from the zenith Z. The arcs originating from P, the projection of the celestial North Pole, are projections of the celestial meridians as observed from Z.

The angular measurements on the celestial horizon are measured from a radius from Z with reference to the meridian line Z, P, H, the celestial meridian of the observer, and are hence true azimuths, i. e., celestial bearings, from the observer. In Fig. 9 the latitude of the observer is assumed, for illustration, to be 38° north. The declination of the body, i. e., the sun is taken as 10° north and its altitude as 48°. S is the point at which the altitude, 48°, on the radius line R meets the declination arc, 10°. The length X—S, measured on the stereographic altitude scale, is the altitude of the sun and the length Z—S is the co-altitude.

The projection of the astronomical triangle is the figure P, Z, S where P, Z and S are respectively projections of the celestial North Pole, of the zenith of the observer and of the celestial position of the sun. The sides of the triangle b and c are straight lines on the projection and side a is a curve lying on the projection of the meridian of the sun passing from P through S.

The angle P, Z, S, or the arc H—X subtending that angle, measures the bearing, i. e., the azimuth of the sun. The side b of the triangle represents the polar distance of the observer and hence Z, Q represents the latitude of the observer. The side c is the zenith distance of the body, the sun, observed, and hence the distance X, S, measured on the altitude scale, is the altitude of the body observed. The line P, S is the polar distance of the body, the sun, observed and hence the arc S, T is its declination. The angle Q, P, T, or the arc Q, T which subtends the angle, is the meridional angle, i. e., the local hour angle, of the body observed. As shown on the projection, it is measured in time, i. e., 9½ hours, thereby giving the local hour angle in time, i. e., half past nine in the morning. The hour angles are measured along the projection of the celestial equator, 270°, Q, 90°.

We claim:

1. A navigational instrument comprising a base adapted to hold a card having printed thereon a stereographic projection of the celestial sphere for a certain degree of latitude, said base having an edge on which are marked diametrically opposite points, vanes hinged to said base adjacent to said points and adapted to be placed in positions perpendicular to the upper surface of said base, one of said vanes having a slot and the other of said vanes having a linear mark, a transparent disc mounted in a circular groove in said base and adapted to be turned about the central axis of said base, detachable means connecting said disc to said base, a vane hinged to said disc adjacent to its axis and adapted to be placed in a position perpendicular to said disc and when so placed containing the axis of said disc and having a linear mark in line with the axis of said disc when said plane is so placed, a radius line marked on said disc and extending to the periphery thereof and having marked thereon a stereographic projection of altitude and a vane hinged to said disc adjacent the outer end of said radius line and adapted to be placed in a position perpendicular to the surface of said disc and having a gnomon which when the vane is in said position is in the plane containing said radius line and perpendicular to said disc.

2. A navigational instrument comprising a base adapted to hold a card having marked thereon a stereographic projection of the celestial sphere for a certain degree of latitude and including means to indicate the stereographic projection of the celestial meridian of the observer, means attached to said base to indicate the position of the stereographic projection of said celestial meridian when said base and card are in a vertical plane, a disc adapted to be turned about the central axis of said base and having a radius line marked thereon, said radius line having marked thereon a stereographic projection of altitude, and a gnomon located on said disc adjacent the outer end of said radius line and adapted to be placed in a position perpendicular to the plane of said base, said gnomon when in said position being in a plane containing said radius line.

3. A navigational instrument comprising a base having a recess adapted to hold a pile of cards having marked thereon the stereographic projections of the celestial sphere for different degrees of latitude and including means to indicate the stereographic projection of the celestial meridian of the observer, means attached to said base to indicate the position of the stereographic projection of said celestial meridian when said base and cards are in a vertical plane, transparent means mounted to turn about the axis of said base and having a radius line marked thereon, said radius line having marked thereon a stereographic projection of altitude, detachable means connecting said transparent means to said base, and a gnomon located on said transparent means adjacent the outer end of said radius line and adapted to be placed in a position perpendicular to the surface of said disc, said gnomon when in said position being in a plane containing said radius line.

BROWNING E. MAREAN, JR.
LLOYD V. KIELHORN.

REFERENCES CITED

The following references are of record in the file of this patent:

UNITED STATES PATENTS

| Number | Name | Date |
|---|---|---|
| 149,837 | Cook | Apr. 21, 1874 |